United States Patent [19]

Choi

[11] Patent Number: 4,734,344

[45] Date of Patent: Mar. 29, 1988

[54] BATTERY SEPARATOR

[75] Inventor: Wai M. Choi, West Newton, Mass.

[73] Assignee: W. R. Grace & Co., Lexington, Mass.

[21] Appl. No.: 864,682

[22] Filed: May 19, 1986

[51] Int. Cl.$^4$ .............................................. H01M 2/16
[52] U.S. Cl. ..................................... 429/206; 428/281; 429/251; 429/254
[58] Field of Search ........................ 429/254, 206, 251; 428/105, 281, 288, 301

[56] References Cited

U.S. PATENT DOCUMENTS

| | | | |
|---|---|---|---|
| 2,812,379 | 11/1957 | Mendelsohn et al. | 429/254 |
| 2,930,829 | 3/1960 | Jacquier | 429/254 |
| 3,035,110 | 5/1962 | Corren | 136/145 |
| 3,114,670 | 12/1963 | Iwasaki | 162/146 |
| 3,655,449 | 4/1972 | Yamamoto et al. | 429/254 |
| 3,891,499 | 6/1975 | Kato et al. | 162/157 |
| 3,915,750 | 10/1975 | Uetani et al. | 136/146 |
| 3,920,508 | 11/1975 | Yonemori | 162/157 |
| 3,967,978 | 7/1976 | Honda et al. | 136/146 |
| 4,024,213 | 5/1977 | Honda et al. | 264/154 |
| 4,110,143 | 8/1978 | Coglano | 156/167 |
| 4,264,691 | 4/1981 | O'Rell et al. | 429/250 |
| 4,272,470 | 6/1981 | Hsu et al. | 264/104 |
| 4,277,572 | 7/1981 | Fujiwara et al. | 525/61 |
| 4,330,602 | 5/1982 | O'Rell et al. | 429/206 |
| 4,361,632 | 11/1982 | Weber et al. | 429/254 |

FOREIGN PATENT DOCUMENTS

| | | | |
|---|---|---|---|
| 82/302182.9 | 11/1982 | European Pat. Off. | |
| 0032354 | 2/1983 | Japan | 429/254 |

Primary Examiner—Donald L. Walton
Attorney, Agent, or Firm—John Dana Hubbard; William L. Baker

[57] ABSTRACT

The present invention is a sheet material for use in alkaline batteries as a separator or interseparator. The sheet is formed of about 30 to about 70 percent polyolefin synthetic pulp, from about 15 to about 65 percent alkali resistant inorganic filler and from about 1 to about 35 percent of one or more long fibers, wherein at least some, if not all of the fiber is a water swellable polyvinyl alcohol based fiber and any remaining long fiber is a nonwater swellable fiber. The water swellable fiber during processing of the sheet forms a gel-like network when contacted by water which retains the filler and bonds the remaining materials together. The resulting sheet has increased tensile strength and alkali resistance and is especially useful in automated battery manufacturing processes.

20 Claims, No Drawings

BATTERY SEPARATOR

This invention is directed to a sheet material suitable for use in an alkaline battery system, preferably as a battery separator or interseparator and to a method of making the same.

BACKGROUND OF THE INVENTION

Alkaline batteries have become increasingly more popular because of their high energy density. As such, these batteries are increasingly used in applications normally reserved for the traditional lead-acid battery systems.

In order to achieve extended battery life and efficiency in alkaline systems, the use of battery separators is required and the use of battery interseparators, as well, is preferred. The battery separators, when used for example in a nickel-cadmium battery, are located between the positive and negative plates so as to provide, (1) a separation between the electrodes of opposite charge, (2) an electrolyte reservoir, (3) a uniform electrolyte distribution across the electrode surface so as to permit uniform current density and (4) a space for electrode expansion.

Interseparators are located between the separators and the plates and provide the same properties as the separators except that interseparators do not normally prevent dendrisatic growth. Separators and interseparators in such systems must be porous, thin, chemically inert to alkaline electrolytes and posses a high degree of wicking properties.

By minimizing the thickness of the separator and/or interseparator one can minimize the amount of electrolyte required and maximize the energy density of the battery. Further, by having a high degree of wicking properties, for example, 5 cm/24 hours as determined by industry standards, one can maintain the electrolyte over the entire surface of the electrode, thereby further increasing the efficiency of the battery.

Battery separators and interseparators used in alkaline batteries at present are commonly formed of polypropylene, polyamide and/or nylon non-woven sheets.

Examples of separators and interseparators in use in alkaline systems today are shown in U.S. Pat. Nos. 4,264,691 and 4,330,602. The separator/interseparator is formed of synthetic pulp, alkali resistant inorganic filler and a long fiber of polyester, polyacrylic, polyamide or polyolefin materials. The separator/interseparator can be formed by a standard paper-making technique. The resultant material meets the desired requirements of thickness and wicking properties. The material however, often does not meet the required standards of tensile strength and filler retention necessary for the rapid development and use of alkaline batteries, especially for the automation of the manufacture of the batteries, particularly secondary alkaline systems, such as nickel-cadmium batteries.

The present invention overcomes the problems inherent in the currently used separators and provides an inexpensive sheet material with the desired tensile strength, chemical inertness, thickness and wicking properties and which is usable in automated assembly processes for forming alkaline batteries.

OBJECTS OF THE INVENTION

It is an object of the present invention to provide a fibrous, filled sheet material useful as a separator or interseparator in alkaline batteries.

It is another object of the present invention to provide a sheet material having enhanced tensile strength and chemical inertness.

Another object of the present invention is to provide a sheet material suitable for use in alkaline battery systems comprised of synthetic pulp, alkali resistant inorganic filler, a water swellable long fiber and preferably a nonswellable long fiber, which has wicking properties of at least 5 cm/24 hours and a tensile strength exceeding 400 lbs/in$^2$.

It is a further object of the present invention to provide a sheet material suitable for use as a battery separator or an interseparator in alkaline batteries.

An additional object of this invention is to provide a battery separator or interseparator comprised of synthetic pulp, one or more inorganic, alkali resistant fillers, and a water swellable long fiber. The separator having excellent tensile strength, wicking properties and alkaline resistance.

SUMMARY OF THE INVENTION

A sheet material suitable for use in alkaline battery systems as a battery separator or interseparator is described which is formed from a composition of from about 30 to about 70 percent polyolefin synthetic pulp, from about 15 to about 65 percent alkaline resistant inorganic filler, from about 1 to about 35 percent of one or more long fibers, a first long fiber selected from a water swellable homopolymer such as polyvinyl alcohol or a copolymer of polyvinyl chloride and polyvinyl alcohol, and optionally a second long fiber selected from a non-water swellable polymer such as polyvinyl alcohol, polyester, polyamide, polyolefin or polyacrylic.

DETAILED DESCRIPTION OF THE INVENTION

All measurements stated in percent in this application, unless otherwise stated, are measured by weight based upon 100% of the finished product weight. Thus, for example 30% represents 30 weight parts out of every 100 weight parts of the finished product.

The present invention is a sheet material, such as a separator or interseparator for alkaline batteries, comprising a mixture of from about 30 to about 70% polyolefin synthetic pulp, from about 15 to about 65% percent of an alkali resistant inorganic filler or fillers, and from about 1 to about 35% of long fibers, wherein some or all of which is water swellable.

The synthetic pulp useful in the present invention is a polyolefin of short fibers having a fiber size and shape similar to that of cellulose pulp. Such synthetic pulps are described in U.S. Pat. Nos. 4,264,691 and 4,330,602, the teachings of which are incorporated herein by reference.

The fiber length of the synthetic pulp is preferably from about 1 to 4 millimeters. The preferred pulp is a polyethylene based pulp. Other pulps are equally useful and may be made of other polyolefins such as polypropylene. Pulp fibers with a high degree of branching or fibrillation are most preferred in the present invention.

The alkali resistant inorganic filler can be any particulate material which is chemically inert to alkaline electrolytes. Alkali resistant inorganic fillers suitable for use in the present invention include for example, titanium dioxide, alumina, calcium oxide, calcium hydroxide, calcium titanate, potassium titanite, magnesium hydroxide, magnesium oxide or zirconium hydroxide and admixtures thereof. Of course, any other alkali resistant filler, which is compatible with the other ingredients used in the sheet of the present invention and known to one skilled in the art can be used as well. A preferred filler is potassium titanite. Another preferred filler is titanium dioxide. The filler preferably has a particle size of from about 0.001 to about 1 microns, a surface area of from about 5 to about 200 square meters per gram and a pore volume of from about 0.01 to about 1 cc per gram.

The long fibers used in the present invention are formed of synthetic polymers, at least some or all of which are water swellable. The present invention may contain only one long fiber which is water swellable. Preferably, two types of long fibers are used in the present invention. The first type is of a water swellable material such as a vinyl alcohol polymer or a copolymer of a polyvinyl chloride (PVC) and a polyvinyl alcohol or a grafted copolymer comprising a vinyl chloride backbone grafted with a vinyl alcohol polymer. Such fibers are commercially available. A commercially available example of a vinyl alcohol polymer water swellable fiber is MEWLON SML by Unitika Kasei, Ltd. An example of a commercially available polyvinyl chloride/polymer alcohol copolymer is sold by Kohjin Co.

The optional, though preferred second long fiber is preferably a nonwater swellable PVA, such as MEWLON F, by Unitika Kasei, Ltd., although other nonwater swellable fibers such as polyester, polyacrylic, polyamide, polyolefin or mixtures thereof, could be used.

The long fibers, swellable and nonswellable, should have a denier of from about 1 to about 12 and a length of at least 0.25 to about 1 inches. The total amount of long fibers can equal the amount of pulp used. Preferably, the total amount of long fibers is approximately 50% of the amount of synthetic pulp. Also the amount of water swellable fiber is equal to or less than the amount of nonwater swellable fibers.

It has unexpectedly been found that the use of the two long fibers, one of which is water swellable, results in a sheet material which has superior tensile strength and filler retention, even without the use of traditional retention aids. It is believed that these results are directly caused by the use of the two different but compatible fibers, especially the use of a water swellable fiber.

While applicant does not wish to be bound to any one theory of invention, applicant submits the following explanation as to the operation of the present invention. It is possible that other explanations could be found to show why and how the present invention operates.

At least the surface of the water swellable long fiber becomes gel-like and sticky when in contact with water during the formation of the sheet of the present invention. This gel-like phase of the fiber acts as a binder or an adhesive, binding all of the remaining ingredients of the sheet together. Further the gel-like phase binds the filler to its surface thereby retaining an increased amount of filler that would normally be lost during the dewatering of the sheet material. Upon drying, the water swellable material returns to its previous state but is now intermeshed and bonded to the other components which increases the tensile strength of the finished sheet. It is also believed that additional bonding between the swellable fiber and the other components occurs where the optional second fiber and the water swellable fiber are both PVA fibers, due to their compatability, although this belief has not been confirmed.

Sheet material formed in accordance with the present invention are porous materials having a median pore diameter of less than 10 microns and a maximum pore diameter of no more than about 35 microns.

The process by which the sheet of the present invention is formed is similar to that described in U.S. Pat. Nos. 4,264,691 and 4,330,602 which are incorporated by reference herein. The process is carried out on normal paper-making machinery, such as a rotoformer or Fourdinier paper machine. A slurry is formed in a conventional paper-making pulper first by charging the synthetic pulp with water and pulping the material until it is thoroughly dispersed. Various dispersants may be added if necessary or desired, or more preferably the pulp may optionally contain a dispersant. One or more fillers are then added and mixed in the pulper until thoroughly dispersed. The pulper content is then discharged into the chest of a rotoformer or a Fourdinier paper machine. A water swellable long fiber is added to the chest and mixed for a sufficient amount of time so as to allow the fiber to swell. Preferably the slurry is warmed to room temperature or greater to aid in the swelling of the fiber. Next a nonwater swellable fiber if used is mixed into the chest. After thoroughly mixing the components in the chest, ground alum, (aluminum sulphate) preferably iron free, is added. The aqueous slurry is then transferred from the chest to a dilution box upstream of a web forming headbox. There, the mixture is diluted with water until the solids concentration is less than 5 percent preferably less than 1 percent. The mixture is then transferred to the headbox and a web is formed on the rotoformer or Fourdinier machine. A lump breaker operating at 20 to 80 psi. smoothes the upper surface of the web. The web is transferred from the rotoformer or Fourdinier machine to an oven and/or one or more drying cans where the web is dried. During the drying or subsequent thereto, the web may optionally be heated to a temperature of from about 125° C. to 150° C. to allow for the partial fusing of the synthetic pulp fibers.

The thickness of the resultant web is directly related to the rate at which the slurry is deposited onto the web forming apparatus, the solids concentration at that moment and the speed of the web forming apparatus. The sheet material should have a thickness of less than 20 mils. Preferably the resultant sheet material should be less than 12 mils, requiring therefore that the deposition of the slurry be at a grammage of less than about 120 grams per square meter (gm/m$^2$), preferably 50 to 120 gm/m$^2$. Of course, should a thicker sheet material be desired, one could easily increase the deposition grammage until a sheet of desired thickness is achieved.

The dried web may be calendered at sufficient pressure and temperature to form a sheet having a thickness of less than 12 mils, preferably 5 to 10 mils.

The use of a retention aid is not required in the present invention as it has been found that the water swellable long fiber attracts and retains the filler to its surface so that the amount of filler lost during drying is substantially reduced. One could use retention aids in the process to further reduce the loss of filler during drying. If used, preferably the slurry is treated with an ionic retention aid such as a cationic polyacrylamide and then an anionic polyacrylamide retention aid. An example of a cationic acrylamide useful in this invention is RETEN 210, a product of Hercules, Inc. A suitable anionic retention aid is RETEN 421 or 521, an anionic acrylamide copolymer of Hercules, Inc. Typical concentrations are 0.04% in water at 600 to 800 ml/minute for the cationic retention aid and 0.025% in water at 600 to 800 ml/minute for the anionic retention aid.

Other aids, such as surfactants to improve the electrical resistance of the sheet material, and wetting agents are also useable in the present invention, so long as they do not have an adverse effect on battery performance or life.

The following examples are given for illustrative purposes only and are not meant to be a limitation on the present invention. All percentages are by weight of the finished product unless otherwise stated.

EXAMPLE I 30 percent of a commercially available short fibered synthetic polyethylene pulp (PULPEX, Grade EA, by Hercules, Inc.) was charged into a papermaking pulper with water. After the pulp is thoroughly dispersed, 45 percent of titanium dioxide is added and pulped for 10 minutes. The pulper contents are then discharged into the chest of a rotoformer machine and 10 percent of a waterswellable long fiber, here a polyvinyl alcohol fiber (MEWLON SML by Unitika Kasei, Ltd.) of 1.0 denier is mixed into the chest. The water temperature is maintained between 20° C. and 30° C. until the fibers have swelled and have formed a gel-like surface. Then 15 percent of a nonwater swellable polyvinyl alcohol fiber (MEWLON F by Unitika Kasei, Ltd.) was added. After thoroughly mixing the chest, 2 percent of ground alum (aluminum sulfate, preferably iron-free) was added. The slurry was then transferred to a dilution box upstream from the rotoformer headbox. The mixture is diluted with water until the solid concentration is less than 0.1 percent. The dilute mixture is then transferred to the headbox and a web is formed on the rotoformer. A lump breaker operating at 80 psi smoothes the top surface of the web. The web is then transferred from the rotoformer to one or more drying cans and after drying is wound into a take up reel.

The resultant web had the following properties:
(A) Tensile strength (machine direction)—1363 psi
(B) Grammage—(grams/m$^2$)—90
(C) Maximum pore size—25 microns
(D) Percent porosity—65
(E) Thickness—8 mils
(F) Wick rate (cm/24 hr.)—greater than 16

COMPARATIVE EXAMPLE I

A sheet material was made in accordance with Example I of U.S. Pat. No. 4,330,602, containing 47.5 percent polyethylene pulp, 47.5 percent titanium dioxide, 5 percent nonwater swellable long fiber of polyethylene terephthalate, 2 percent alum and ionic retention aids.

The resultant sheet had the following properties:
(A) Tensile strength—470 psi
(B) Grammage (gm/m$^2$)—90
(C) Maximum Pore Size—15 microns
(D) Percent Porosity—62
(E) Thickness—8 mils
(F) Wick Rate (cm/24 hr.)—greater than 16

As one can see from the example above, the present invention has a tensile strength which greatly exceeds that previously available in a sheet material for alkaline battery systems.

EXAMPLE II

The procedure of Example I was carried out except as follows: a cationic acrylamide containing retention aid (RETEN 210 by Hercules, Inc.) was added to the dilution box at a concentration of 0.05 percent in water at 600 ml/minute. An anionic acrylamide retention aid (RETEN 521, by Hercules, Inc.) was added in the dilution box three feet downstream of the first retention aid at a concentration of 0.025 percent in water at 800 ml/minute.

The resultant sheet had properties similar to those of Example 1 and was found to have retained approximately 3% more filler than the sheet of Example 1.

EXAMPLE III

The procedure of Example 1 was carried out except as follows: the nonwater swellable polyvinyl alcohol fiber was replaced with 15 percent of a nonwater swellable polypropylene long fiber (HERCULON 153, by Hercules, Inc.)

The resultant sheet had the following properties:
(A) Tensile strength 812.5 psi
(B) Grammage (gm/m$^2$)—90
(C) Maximum Pore Size—25 microns
(D) Percent Porosity—65
(E) Thickness—8 mils
(F) Wick rate (cm/24 hr.)—greater than 16

While this invention has been described with reference to its preferred embodiment in the alkaline battery industry, other embodiments of the present invention can be used in other battery systems or other industries where the need for a thin, porous, alkaline resistant sheet with high tensile strength is desired.

Further, while this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What I claim is:

1. A sheet material for use in an alkaline battery system comprising from about 30 to about 70 weight percent of the sheet material of polyolefin synthetic pulp, from about 15 to about 65 weight percent of the sheet material of an alkali resistant inorganic filler, and from about 1 to 35 weight percent of the sheet material of long synthetic fibers having lengths of at least about 0.25 inch wherein at least some of the long synthetic fibers are water swellable vinyl alcohol so as to bind at least some of the remaining ingredients together.

2. A sheet material of claim 1 wherein the polyolefin synthetic pulp is selected from polyethylene, polypropylene, or a combination thereof; the filler is selected from titanium dioxide, alumina, magnesia, potassium titanite, zirconium hydroxide, magnesium hydroxide or mixtures thereof; the water swellable vinyl alcohol long sythetic fibers are comprised of a polymer of vinyl alcohol and any remaining long synthetic fibers are selected from nonwater swellable polyvinyl alcohol, polyester, polyacrylic, polyamide, polyolefin and mixtures thereof.

3. The sheet material of claim 1 wherein the long synthetic fibers are a first water swellable polyvinyl alcohol fiber and a second nonwater swellable polyvinyl alcohol fiber.

4. The sheet material of claim 3 wherein the amount of water swellable fiber is equal to or less than the amount of nonwater swellable fiber.

5. The sheet material of claim 1 wherein the amount of long synthetic fiber is equal to or less than the amount of synthetic pulp.

6. The sheet material of claim 1 wherein the tensile strength of the sheet material is at least 400 pounds per square inch.

7. The sheet material of claim 2 wherein said vinyl alcohol polymer is a copolymer.

8. The sheet material of claim 7, wherein said vinyl alcohol polymer is a copolymer of vinyl alcohol and vinyl chloride.

9. The sheet material of claim 8 wherein said copolymer comprises a graft copolymer having a vinyl chloride backbone grafted with a water swellable vinyl alcohol.

10. The sheet material of claim 1 wherein the long synthetic fibers have a denier of about 1 to about 12 and a length of from about 0.25 to about 1.5 inches.

11. An alkali resistant sheet material comprising from about 30 to about 70 weight percent polyolefin synthetic pulp, from about 15 to 65 weight percent of filler and from about 1 to 35 weight percent of one or more long synthetic fibers, wherein at least some or all of the long synthetic fibers are water swellable vinyl alcohol.

12. The alkali resistant sheet material of claim 11 wherein the water swellable long synthetic fibers are selected from polyvinyl alcohol fibers, a copolymer fiber comprising a polyvinyl chloride and a water swellable polyvinyl alcohol, and mixtures thereof.

13. The alkali resistant sheet material of claim 11 wherein the long synthetic fibers are comprised of water swellable fibers and a nonwater swellable fibers in approximately equal proportions.

14. The alkali resistant sheet material of claim 11 wherein the long synthetic fibers are a water swellable vinyl alcohol fiber and a nonwater swellable fiber and wherein the water swellable fiber is present in an amount equal to or less than that of the nonwater swellable fiber.

15. The alkali resistant sheet material of claim 11 wherein the long synthetic fibers have deniers of about 1.0 to about 12 and lengths of about 0.25 to about 1.5 inches.

16. A battery separator for use in alkaline batteries comprising a sheet of from about 30 to about 70 weight percent of the sheet of polyolefin synthetic pulp, from about 15 to 65 weight percent of the sheet of an alkali resistant inorganic filler, from about 0.5 to 17.5 weight percent of the sheet of a water swellable vinyl alcohol long fiber and from about 0.5 to about 17.5 weight percent of the sheet of a nonwater swellable long fiber.

17. The battery separator of claim 16 wherein the polyolefin pulp is selected from the group consisting of polyethylene, polypropylene or a combination thereof; the filler is selected from the group consisting of titanium dioxide, alumina, magnesia, potassium titanite, zirconium hydroxide, magnezium hydroxide or a mixture thereof; the water swellable vinyl alcohol long fiber is selected from the group consisting of polyvinyl alcohol, a copolymer of polyvinyl chloride and polyvinyl alcohol or mixtures thereof; and the nonwater swellable long fiber is selected from the group consisting of polyvinyl alcohol, polyester, polyacrylic, polymaide, polyolefin or mixtures thereof.

18. The battery separator of claim 16, wherein the sheet material has a tensile strength of at least 400 psi.

19. The battery separator of claim 16, wherein the water swellable vinyl alcohol long fiber and the nonwater swellable long fiber have a denier of from about 1 to about 12 and length from about 0.25 to about 1.5 inches.

20. An alkaline battery comprising one or more positive electrodes, one or more negative electrodes, an alkaline based electrolyte solution and a sheet material for use as a separator or interseparator comprised of from about 30 to about 70 weight percent of the sheet material of synthetic polyolefin pulp, from about 15 to about 65 weight percent of the sheet material of inorganic alkali resistant filler, and from about 1 to about 35 weight percent of the sheet material of a long synthetic fiber, at least some of which is water swellable vinyl alcohol polymer.

* * * * *